United States Patent
Hahn et al.

(10) Patent No.: US 8,654,482 B1
(45) Date of Patent: Feb. 18, 2014

(54) DUAL STAGE ACTUATOR SUSPENSION HAVING A SINGLE MICROACTUATOR AND EMPLOYING PSEUDO SYMMETRY TO ACHIEVE SUSPENSION BALANCE

(71) Applicant: Magnecomp Corporation, Murrieta, CA (US)

(72) Inventors: Peter Hahn, Wildomar, CA (US); Wei Keat Chai, San Jose, CA (US); Kuen Chee Ee, Chino, CA (US); Brett Holaway, Wangnoi (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 13/957,211

(22) Filed: Aug. 1, 2013

Related U.S. Application Data (60) Division of application No. 12/825,274, filed on Jun. 28, 2010, now abandoned, which is a continuation-in-part of application No. 12/705,980, filed on Feb. 16, 2010, now Pat. No. 8,228,642.

(60) Provisional application No. 61/152,865, filed on Feb. 16, 2009.

(51) Int. Cl.
*G11B 21/24* (2006.01)
*G11B 5/596* (2006.01)

(52) U.S. Cl.
USPC ..... 360/294.4; 360/244.5; 360/75; 29/603.03

(58) Field of Classification Search
CPC .................................................. G11B 5/4873
USPC ................... 360/294.4, 244.5, 75; 29/603.03
See application file for complete search history.

(56) References Cited

U.S. PATENT DOCUMENTS

| | | |
|---|---|---|
| 4,814,908 A | 3/1989 | Schmitz |
| 5,189,578 A | 2/1993 | Mori et al. |
| 5,440,437 A | 8/1995 | Sanada et al. |
| 5,959,808 A | 9/1999 | Fan et al. |
| 5,995,334 A | 11/1999 | Fan et al. |

(Continued)

FOREIGN PATENT DOCUMENTS

| JP | 02226560 A | 9/1990 | ............. G11B 21/10 |

OTHER PUBLICATIONS

T.-L. Chen, et al., "Suspension Vibration Compensation Using a MEMS Microactuator in Hard Disk Drives," 2002, pp. 757-762, Proc. 2nd IFAC Conf. Mechatronic Systems, Berkeley, California.

(Continued)

*Primary Examiner* — Craig A. Renner
(74) *Attorney, Agent, or Firm* — Intellectual Property Law Offices of Joel Voelzke, APC

(57) ABSTRACT

A dual stage actuator (DSA) suspension has a single microactuator such as a PZT element on one side of central longitudinal axis of the suspension, and a pseudo symmetry structure formed or affixed on the other side of the central longitudinal axis opposite the PZT. The pseudo symmetry structure has mass and stiffness that mirrors the PZT, thus keeping the suspension mechanically balanced and symmetric about the longitudinal axis for improved suspension performance especially in a shock environment. The pseudo symmetry structure can include a spring to keep the PZT under compression to prevent PZT failure, and/or a strain gauge for use by the head positioning servo-control system.

18 Claims, 4 Drawing Sheets

(56) References Cited

U.S. PATENT DOCUMENTS

| | | | |
|---|---|---|---|
| 6,002,549 | A | 12/1999 | Berman et al. |
| 6,072,665 | A * | 6/2000 | Ferrari et al. .............. 360/245.9 |
| 6,163,434 | A | 12/2000 | Zhang |
| 6,268,983 | B1 | 7/2001 | Imada et al. |
| 6,298,545 | B1 | 10/2001 | Mohajerani et al. |
| 6,381,104 | B1 | 4/2002 | Soeno et al. |
| 6,473,274 | B1 | 10/2002 | Maimone et al. |
| 6,541,931 | B2 | 4/2003 | Ho et al. |
| 6,614,627 | B1 | 9/2003 | Shimizu et al. |
| 6,731,472 | B2 | 5/2004 | Okamoto et al. |
| 6,851,120 | B2 | 2/2005 | Crane et al. |
| 6,903,486 | B2 | 6/2005 | Jerman et al. |
| 7,038,888 | B2 | 5/2006 | Ma |
| 7,382,583 | B2 | 6/2008 | Hirano et al. |
| 7,872,834 | B1 | 1/2011 | Pokornowski et al. |
| 8,228,642 | B1 | 7/2012 | Hahn et al. |
| 2006/0279880 | A1 | 12/2006 | Boutaghou et al. |
| 2007/0291418 | A1 | 12/2007 | Kwon et al. |
| 2009/0027807 | A1 | 1/2009 | Yao et al. |
| 2009/0244786 | A1 | 10/2009 | Hatch |
| 2010/0097726 | A1 | 4/2010 | Greminger et al. |

OTHER PUBLICATIONS

M. Banther et al., "Optimal Strain Gauge Placement for an Instrumented Disk Drive Suspension," 1998, pp. 3023-3027, 5 Proceedings of the Am. Control Conference (Abstract only).

Office Action dated Sep. 19, 2012 in CIP U.S. Appl. No. 12/825,274.

Claims and Remarks in Amendment dated Oct. 22, 2012 in CIP U.S. Appl. No. 12/825,274.

Office Action dated Apr. 2, 2013 in CIP U.S. Appl. No. 12/825,274.

Claims as filed in Divisional U.S. Appl. No. 13/530,522, filed Jun. 22, 2012.

Office Action dated Feb. 5, 2013 in Divisional U.S. Appl. No. 13/530,522.

* cited by examiner

DUAL STAGE ACTUATOR SUSPENSION HAVING A SINGLE MICROACTUATOR AND EMPLOYING PSEUDO SYMMETRY TO ACHIEVE SUSPENSION BALANCE

CROSS-REFERENCE TO RELATED APPLICATIONS

This application is a divisional of U.S. application Ser. No. 12/825,274 filed Jun. 28, 2010, which is a continuation-in-part of U.S. application Ser. No. 12/705,980 filed Feb. 16, 2010, now U.S. Pat. No. 8,228,642, which claims priority from U.S. Provisional Patent Application Ser. No. 61/152,865 filed Feb. 16, 2009, the disclosures of which are incorporated by reference herein as if set forth in their entireties.

BACKGROUND OF THE INVENTION

1. Field of the Invention

This invention relates to the field of hard disk drive suspensions having dual stage actuators. More particularly, this invention relates to the field of a dual stage actuator suspension for a hard disk drive, the suspension having a single microactuator device and employing pseudo symmetry to balance the suspension.

2. Description of Related Art

In a hard disk drive, the suspension is the component that holds the read-write head over the desired data track on the spinning magnetic hard drive. The disk drive could also be an optical disk or possibly other data storage technologies. As track densities increase and drives are made smaller, there is a constant need in the industry for greater precision in the disk drive components including the actuator(s) that move the read-write head to the correct data track.

Figure 1:
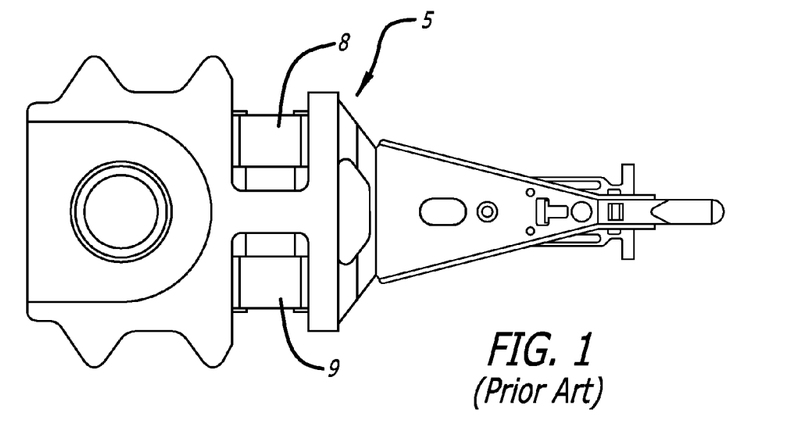
FIG. 1 is a top plan view of a prior art DSA suspension employing two non-split PZTs.

Suspensions have been proposed that have dual stage actuators (DSAs), with the first stage being the voice coil motor that traditionally has moved the suspension, and the second stage being a microactuator mounted on the suspension itself that makes extremely fine adjustments to the head position. The system that positions the head, using either the voice coil motor in a traditional single actuator suspension, or a combination of the voice coil motor and the microactuator in a DSA suspension, is called the head positioning servo-system. The microactuator typically comprises a pair of piezoelectric devices such as lead zirconate titanate (PZT) devices mounted in a push-pull configuration, such that one PZT pulls one side of the suspension while the other PZT pushes the other side. For purposes of the present disclosure and for purposes of simplicity of discussion, the microactuator will generally be referred to as a PZT although it will be understood that microactuators other than PZTs can be used. Representative of a dual PZT type DSA suspension are U.S. Pat. No. 6,614,627 issued to Shimizu et al, and U.S. Pat. No. 6,731,472 issued to Okamoto et al, which describe DSA suspensions using PZT devices as the microactuators. Those patents employ two non-split PZTs. A non-split PZT, also called a single pole PZT, is a PZT which has only a single electrical pole per face. FIG. 1 is a representative illustration of a DSA type suspension 5 having two single-pole PZTs 8 and 9 according to the prior art.

Another known design uses a split PZT. A split PZT is a single device in which the device is split into two portions that can be driven separately, such that a single device is capable of both expanding on one side and contracting on the other side. Split PZTs are typically formed by metalizing both the top face and the bottom face of the device, with a split line in the middle created by photo patterning. A split PZT behaves as if it is two separate PZTs. Split PZTs typically have three electrical connections: a right side driving voltage connection, a left side driving voltage connection, and a common ground connection.

Other configurations of PZT microactuated suspensions have been proposed. U.S. Pat. No. 6,381,104 issued to Soeno et al. shows a piezoelectric moving-slider microactuator that moves the slider by rotation. U.S. Pat. No. 7,382,583 issued to Hirano et al. describes a DSA suspension that uses a rotary piezoelectric microactuator.

DSA suspensions that use a microactuator other than a PZT microactuator have also been proposed. U.S. Pat. Nos. 5,959,808 issued to Fan et al. and 5,995,334 issued to Fan et al. describe electrostatic microactuators for suspensions.

DSA suspensions have also been proposed using PZTs in various locations, including on the mount plate, on the load beam, or on the gimbal tongue close to the slider.

Due to the additional cost of DSA suspensions over traditional suspensions, it is believed that DSA suspensions have only been recently become available commercially. There is therefore a need for reducing manufacturing costs of DSA suspensions.

SUMMARY OF THE INVENTION

The present invention is of a DSA type suspension requiring only a single non-split PZT microactuator, but which nevertheless is balanced about the central longitudinal axis of the suspension or load beam to within an acceptably high degree of mass balance and inertial balance. A mechanically balanced suspension will generally perform better, such as by not twisting in response to vertical movements of the suspension as the disk surface flutters or as the drive is bumped.

To achieve the balancing, an element which will be called herein a pseudo symmetry structure or element, or balancing structure or element, is either mounted to or fabricated on the suspension in a location generally opposite the microactuator. The pseudo symmetry element is designed such that it has a mass, a stiffness, and preferably a mass distribution that generally correspond to the microactuator, thus making the suspension generally symmetric about the longitudinal axis as measured by mass, stiffness, inertial distribution, and other relevant parameters.

A DSA suspension according to the present invention therefore typically has a central longitudinal axis, a PZT microactuator mounted on a first lateral side of the central longitudinal axis for making fine radial adjustments in the position of a read-write head at or near the distal end of the suspension, and a pseudo symmetry structure on a second and opposite later side of the central longitudinal axis, the pseudo symmetry structure mimicking the mechanical characteristics of the PZT and being generally disposed in mirror relation thereto. The pseudo symmetric structure is created such that it has similar mass and stiffness, and preferably similar mass distribution, as that of the PZT, in order to keep the suspension inertially symmetric about the central longitudinal axis.

In a first embodiment, the pseudo symmetry structure comprises a stainless steel pseudo symmetry element that is welded or otherwise affixed to the suspension on a first side of a central longitudinal axis of the suspension generally opposite the PZT mounted on the second side of the central longitudinal axis. The pseudo symmetry element is generally symmetrical about both its x and y horizontal axes, and has a central hole therethrough in order to give the pseudo symmetry structure a spring-like stiffness that generally matches the spring-like stiffness of the PZT.

By requiring only a single non-split PZT instead of either two non-split PZTs or a single split PZT as in previous designs, the present invention allows for simpler and therefore lower cost DSA suspensions that nevertheless are acceptably symmetrical about the longitudinal axis. This is true regardless of whether the microactuator is located on the mount plate, on the beam portion, on the gimbal tongue, or anywhere else on the suspension.

In a further embodiment, the pseudo symmetry structure can include a spring pre-loaded in compression, the spring exerting a bias force that keeps the PZT in compression in order to the brittle PZT from cracking.

In a still further embodiment, the pseudo symmetry structure can include one or more strain gauges for measuring vibration and shock, with the head positioning servo-system using the strain gauge outputs to more precisely keep the head at its intended position and hence reduce the closed-loop bandwidth of the head positioning servo-system, thus reducing track misregistration.

In embodiments in which the pseudo symmetry structure includes one or more strain gauges, the invention includes a method of positioning a hard disk drive suspension, the method including using a microactuator mounted on the suspension to effect fine movements the suspension head, using a passive structure comprising a pseudo symmetry structure to counterbalance the microactuator, the pseudo symmetry structure including one or more strain gauges, the method further comprising determining movements of the suspension based at least in part on outputs from the strain gages, and sending actuation signals to the voice coil motor which defines the primary actuator and/or the microactuator at least partially in response to the movements as determined by processing outputs from the strain gauges, in such a manner as to increased the closed-loop bandwidth of the head positioning servo-system, thus reducing track misregistration.

Exemplary embodiments of the invention will be further described below with reference to the drawings, in which like numbers refer to like parts.

DETAILED DESCRIPTION OF THE PREFERRED EMBODIMENTS

Figure 2:
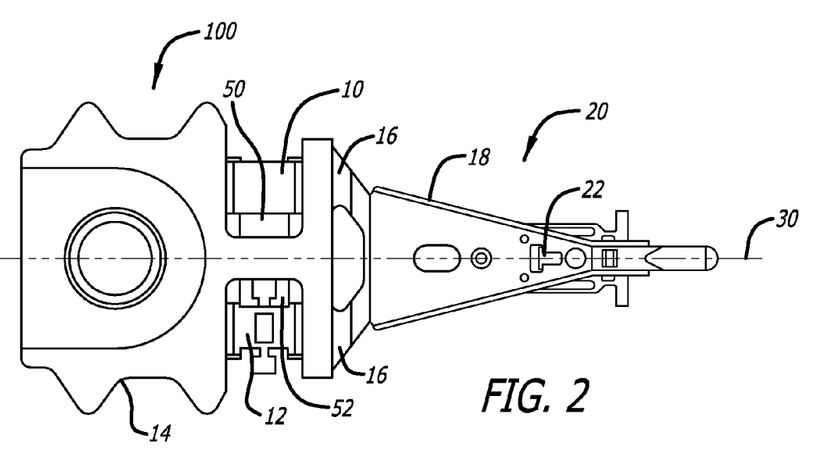
FIG. 2 is a top plan view of a DSA suspension according to a first embodiment of the present invention.

FIG. 2 is a top plan view of a DSA suspension 100 having PZT 10 and balancing structure or pseudo symmetry structure 12 according to a first embodiment of the present invention. PZT 10 has convention electrical connections thereto (not shown) that will add somewhat to the weight and inertial characteristics of PZT 10. For purposes of the present discussion throughout this disclosure and the appended claims, what will be referred to as the PZT or other microactuator encompasses the electrical connections thereto and their weights. Pseudo symmetry structure 12 may be fabricated separately and thereafter affixed to suspension 100 such as by an adhesive such as epoxy, or by laser welding. It is currently anticipated that the preferred embodiment will include at least one added stainless steel component that is formed separately and later affixed to the suspension by welding. Accordingly, in the discussion that follows, although the pseudo symmetry structure component will be referred to for brevity as being welded to the suspension, it will be understood that the component could be affixed to suspension 100 by any other suitable means. PZT 10 and pseudo symmetry structure 12 are located on opposite sides of central longitudinal axis 30 of suspension 100, in generally mirror relation. That is, PZT 10 and pseudo symmetry structure 12 lie on opposite lateral sides of suspension 100. In the embodiment, suspension 100 has two voids or gaps 50 and 52 formed therein, with the voids being generally of the same size and shape and disposed in mirror relation about central longitudinal axis 30. PZT 10 spans first gap 50, and pseudo symmetry structure 12 spans second gap 52, also in generally mirror relation about central longitudinal axis 30, with pseudo symmetry structure 12 welded across gap 52.

Alternatively, instead of being welded to suspension 100, pseudo symmetry structure 12 may be integrally formed with suspension 100 by etching, stamping, laser cutting, or otherwise working suspension 100 by a material removal method, or by a combination of working the suspension to remove material from it and adding components to the suspension. Pseudo symmetry structure 12 can be either thicker, thinner, or the same thickness as, the surrounding stainless steel, due to the ability to selectively etch away stainless steel material from either the area of the stainless steel sheet that will become pseudo symmetry structure 12 and/or from the area that will become the mount plate, the load beam, or other structure with which pseudo symmetry structure 12 will be integrally formed.

PZT 10 and pseudo symmetry structure 12 can be located on a tip of mount plate 14 which defines the base portion of the suspension, near and proximal to suspension springs 16 as shown in FIG. 2, or could be located on beam portion 18 of load beam 20, or on gimbal tongue 22, or in any other suitable location as will be apparent to those skilled in the relevant art.

Pseudo symmetry structure 12 preferably matches the PZT 10 to within 40%, and more preferably to within 20%, and more preferably still to within 10%, and more preferably still to within 5%, in each of the parameters of mass, stiffness, inertial distribution, and any other relevant parameters, with the result that the overall suspension is mass, inertially, and stiffness balanced about the central longitudinal axis to within at least 10%, and preferably to within 5%, and more preferably still to within 2%.

Figure 3:
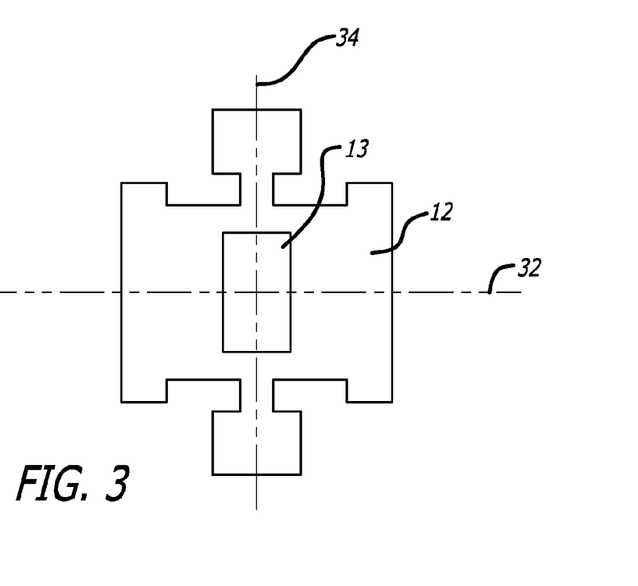
FIG. 3 is a top plan view of pseudo symmetry element 12 of the suspension of FIG. 2.

FIG. 3 is a top plan view of pseudo symmetry structure 12 of suspension 100 of FIG. 2. If pseudo symmetry structure 12 having central hole 13 is formed integrally with the stainless steel suspension 100 by etching, stamping, or other forming operation that is otherwise part of the load beam manufacturing process, then no additional parts will be required to be formed and affixed to the suspension 100, resulting in substantial manufacturing cost reduction. Alternatively, pseudo symmetry structure 12 could be formed separately of different materials or combinations of materials and thereafter affixed to suspension 100 such as by laser welding, adhesive, or by other known methods. Regardless of whether pseudo symmetry structure 12 is integrally formed with suspension 100 or is separately formed and thereafter affixed thereto, pseudo symmetry structure 12 will not require an electrical circuit trace to be routed thereto and electrically connected thereto, thus eliminating the cost associated with routing and connecting electrical circuits to a second PZT, or to the second half of a split PZT, as in prior art designs. Even if PZT 10 is a split PZT, simplicity and cost savings are still realized because the electrical traces needed to drive the two halves of the PZT are routed and connected to only one side of suspension 100 while still maintaining pseudo symmetry and balance of suspension 100. In FIG. 3, as in other embodiments illustrated herein, the pseudo symmetry structure is symmetric about two horizontal axes 32 and 34. In generally, however, the pseudo symmetry structure need not necessarily be symmetric.

Figure 4A:
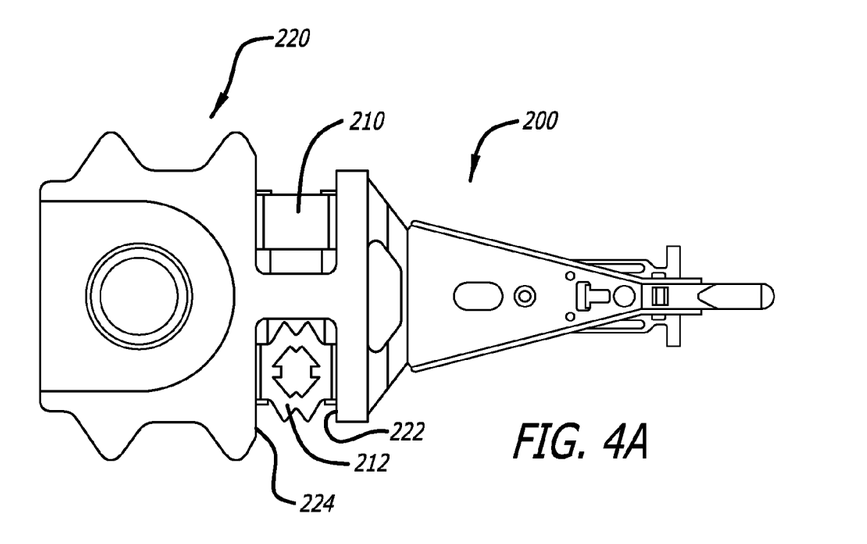
FIG. 4A is a top plan view of a DSA suspension having a single non-split PZT and a pseudo symmetry structure according to a second embodiment of the invention.

FIG. 4A is a top plan view of a DSA suspension 200 having a single non-split PZT 210 and a pseudo symmetry structure 212 according to a second embodiment of the invention. This embodiment is similar to the embodiment of FIG. 2 except that the shape of pseudo symmetry structure 212 is different.

Figure 4B:
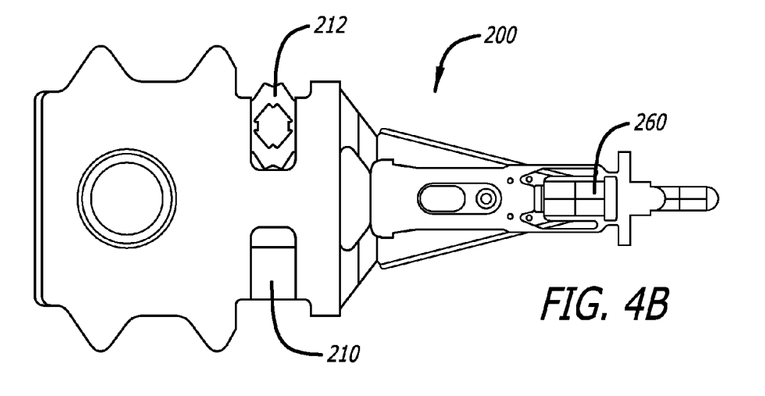
FIG. 4B is a bottom plan view of the suspension of FIG. 4A.

FIG. 4B is a bottom plan view of the suspension of FIG. 4A. This view shows magnetic head slider 260 which is a conventional head slider. In operation, PZT microactuator 210 expands or contracts in response to a microactuator driving voltage applied thereto causing the distal end of suspension 200 carrying head slider 260 to move slightly up or down as oriented in the figure, thus effecting microfine movements of head slider 260 in order to keep head slider 260 properly positioned over the desired data track on the magnetic disk surface (not shown). Pseudo symmetry element 212 counterbalances PZT 210 statically, inertially, and in stiffness.

Figure 5:
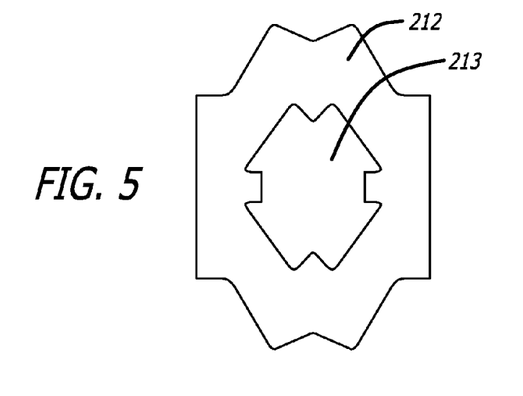
FIG. 5 is a top plan view of the pseudo symmetry component of the suspension of FIG. 4A.

FIG. 5 is a top plan view of the pseudo symmetry structure 212 of the suspension of FIG. 4A.

In the embodiments of FIGS. 2-5 and with particular reference to FIG. 5, the balancing structures have a generally ring shape having a central hole 213 or other aperture formed therein. By adjusting the size and shape of central hole 213, the ring inner and outer diameters, the shape and contours of the ring, the thickness of the ring, and the stiffness of the pseudo symmetry structure 212 in the x, y, and z directions, the pseudo symmetry structure 212 can be made to have mechanical characteristics that generally mirror the corresponding mechanical characteristics of PZT 210.

Pseudo symmetry structure 212 need not have a single central hole 213 therethrough, but could instead have a plurality of holes, slots, or other apertures formed therein, or adjacent portions of the suspension 200 could have one or a plurality of holes, slots, or apertures formed therein, so long as the overall balancing structure generally mirrors the characteristics of PZT 210. The pseudo symmetry structure 212 need not be flat, but could in general have any three dimensional shape. A three dimensional shape, similar to the shape of PZT 210 itself, could better simulate and thus mirror the inertial components of PZT 210 in the three linear directions and the three rotational directions.

The characteristics of pseudo symmetry structure 212 can be further modified, either over its entirety or locally, by other processing techniques as well. A first such possible technique is partial etching of pseudo symmetry structure 212 on either side or both sides to create depressions, mesas, ridges, valleys, or any other contoured features, similar to the triangular partial etch patterns visible in FIG. 6 in suspension 300 in its load beam near the suspension springs. The material of pseudo symmetry structure 212 could also be modified by localized laser irradiation. Still further, the material could be modified by heat treating, although heat treating is currently considered undesirable because the stainless steel foil used to make the suspensions is usually strain hardened, and heat treating would therefore undesirably anneal the steel. Other techniques to modify the characteristics of pseudo symmetry structure 212, either overall or locally, will be apparent to those skilled in the art of materials science and materials processing. All of those techniques can allow focused tailoring of stiffness and deflection in pseudo symmetry structure 212 in the x, y, and z axes. Laser irradiation and various other localized material processing techniques could also be used to locally tailor the characteristics of the stainless steel elsewhere on the suspension to assist in the overall balancing of the suspension.

Although PZT 210 will in most cases be the component of suspension 200 that contributes the most to non-symmetry of suspension 200, other components including but not limited to the electrical signal trace (not shown) could contribute to static and inertial asymmetry of suspension 200. Pseudo symmetry structure 212 could be designed to at least partially compensate for those other asymmetries as well thereby counterbalancing those other asymmetries.

Additionally, the balancing structure need not be a single pseudo symmetry element that by itself counterbalances PZT 210. Rather, the overall pseudo symmetry structure could be comprised of a tab, spring, and/or other structure(s) integrally formed with one or more components of suspension 200, combined with a spring element, weight, or other element, preferably of stainless steel welded to the suspension, such that the combined characteristics of the component(s) of the pseudo symmetry structure that are formed integrally with suspension 200 combined with the component(s) of the pseudo symmetry structure that are formed separately and later affixed to suspension 200 generally mirror and therefore counterbalance the characteristics of PZT 210 located on the other side of the central longitudinal axis of suspension 200. Such a more general pseudo symmetry structure or balancing structure is shown in FIG. 6 which is described below.

Figure 6:
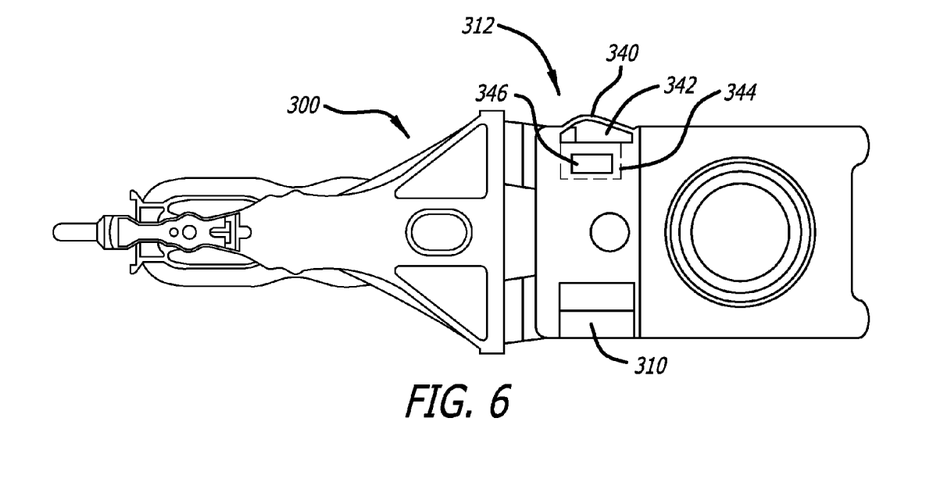
FIG. 6 is a top plan view of a suspension having a spring feature formed integrally in the suspension in order to balance the stiffness characteristics of the PZT microactuator, according to a third embodiment of the invention.

FIG. 6 is a top plan view of a suspension having a spring feature formed integrally in the suspension in order to balance the stiffness characteristics of the PZT microactuator, according to a further embodiment. In particular, suspension 300 has a pseudo symmetry structure 312 comprising several different components, specifically: aperture 342 formed in suspension 300; a spring 340 formed integrally with suspension 300; a portion 344 of the suspension which is not etched away and which therefore does not mirror the cavity across which PZT 310 extends, and an added weight 346 welded or otherwise affixed to suspension 300. Taken together, suspension portion 344, aperture 342, spring 340, and added weight 346 define pseudo symmetry structure 312 which counterbalances PZT 310. Preferably unremoved suspension portion 344, aperture 342, spring 340, and added weight 346 are all adjacent each other, and preferably all of those elements lie within a common area that is less than or equal to the size of the area occupied by PZT 310.

In all of the embodiments shown, the pseudo symmetry structures 12 and 212, and spring 340, are designed with the knowledge of how the stiffness of the PZT compares to the stiffness of the stainless steel used for the pseudo symmetry structures. For the embodiment shown in FIG. 6, typically, the stiffness of PZT 310 will be about one third the stiffness of the stainless steel in spring 340, where the stainless steel in spring 340 has the same thickness as the thickness of the tip of the mount plate to which the suspension springs are attached.

PZTs are relatively brittle devices. As such, they are subject to cracking when loaded in tension. Accordingly, in an additional embodiment of the invention, the pseudo symmetry structure serves the additional function of preloading the PZT in compression so that in use, the PZT stays compressed and does not experience even momentary tensile forces which could damage the PZT. In the embodiment of FIGS. 4A and 4B, for example, the pseudo symmetry structure 212 can be longitudinally compressed slightly before it is inserted between opposing walls 222, 224 of base portion 220, so that pseudo symmetry structure 212 acts like a spring in compression and exerts an outward bias force tending to push walls 222 and 224 apart, and thereby also placing PZT 210 under compression.

In yet a further embodiment, the pseudo symmetry structure can perform one or more functions other than merely providing mass distribution and balancing, and otherwise mirroring the static and dynamic characteristics of the PZT. The pseudo symmetry structure can be, or can include, either an active component, or a passive component such as a sensor that monitors one or more conditions that are useful in controlling or monitoring the suspension.

In a still further embodiment, the pseudo symmetry structure can included one or more strain gauges. Mounting one or more strain gauges on the pseudo symmetry structure is advantageous for the following reason. Today's hard drives have track densities in the neighborhood of 25,000 tracks per inch. There is continual pressure in the disk drive industry to make the data tracks on a magnetic hard disk ever smaller, and hence pack more data onto a disk of a given physical size. The ever decreasing track widths require a greater close-loop bandwidth of the head positioning servo-system in order to combat track misregistration caused by windage, shock, and other vibrations. The bandwidth of the servo can be increased by using adaptive feedforward control to cancel suspension vibration using the voice coil motor and/or the microactuator. Such active techniques to sense and compensate for suspension vibration have been proposed and discussed in the literature at, e.g., T.-L. Chen, K. Oldham, Y. Li and R. Horowitz, "Suspension Vibration Compensation Using a MEMS Microactuator in Hard Disk Drives," Proc. 2nd IFAC Conf. Mechatronic Systems, Berkeley, Calif., pp. 757-762 (2002), which is hereby incorporated by reference.

Strain gauges can be fashioned using a variety of materials and techniques, but a commonly used strain gauge takes the form of a metal foil adhered to a flexible substrate. Generally speaking, a strain gauge takes advantage of the physical property of electrical conductance and its dependence on not merely the electrical conductivity of a conductor, which is a property of its material, but also the conductor's geometry. When an electrical conductor is stretched within the limits of its elasticity such that it does not break or permanently deform, it will become narrower and longer, changes that increase its electrical resistance end-to-end. Conversely, when a conductor is compressed such that it does not buckle, it will broaden and shorten, changes that decrease its electrical resistance end-to-end. From the measured electrical resistance of the strain gauge, the amount of applied stress may be inferred. A typical strain gauge arranges a long, thin conductive strip in a zig-zag pattern of parallel lines such that a small amount of stress in the direction of the orientation of the parallel lines results in a multiplicatively larger strain over the effective length of the conductor—and hence a multiplicatively larger change in resistance—than would be observed with a single straight-line conductive wire.

Figure 7A:
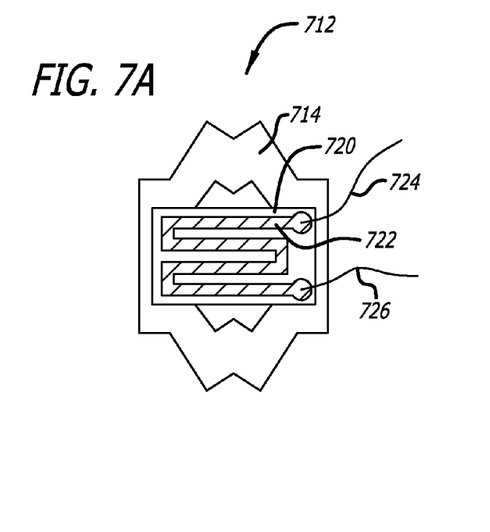
FIG. 7A is a top plan view of a pseudo symmetry structure according to a further embodiment of the invention, and showing a first strain gauge on the top side thereof.
Figure 7B:
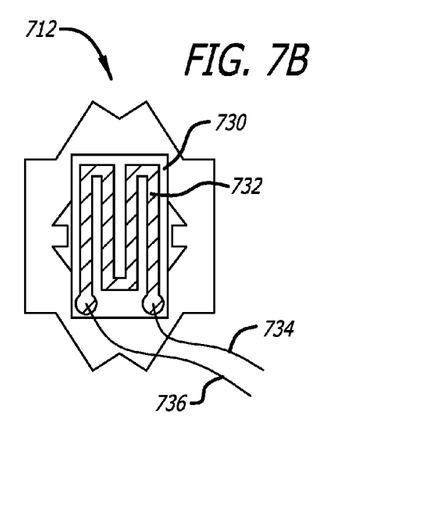
FIG. 7B is a bottom plan view of the pseudo symmetry structure of FIG. 7A, showing a second strain gauge on the bottom side thereof.

In an embodiment shown in FIGS. 7A and 7B, two strain gauges are mounted on the pseudo symmetry structure in orthogonal directions in order to measure strain in both the x and y directions, i.e., both longitudinally and laterally with respect to the load beam. FIG. 7A is a top plan view, and FIG. 7B is a bottom plan view, of a pseudo symmetry structure according to such an embodiment. In the embodiment, pseudo symmetry structure 712 includes both a stainless steel spring 714 similar to pseudo symmetry structure 212 in FIG. 5, and also includes two strain gauges. A first strain gauge 720 is affixed to the top face of spring 714, and measures x-direction strain. Wires or other signal conductors 724 and 726 are attached to strain gauge 720 at opposite ends of serpentine conductor 722. A second strain gauge 730 is affixed to the bottom face of spring 714, and measures y-direction strain. Wires or other signal conductors 734, 736 are attached to strain gauge 730 at opposite ends of serpentine conductor 732, and carry what represents the output of the strain gauge. Typically, strain gauges 720 and 730 would have many more turns within serpentine conductors 722 and 732, respectively, than illustrated. The strain gauges need not be mounted exactly orthogonally; rather, as long as the strain gauges are oriented to have an orthogonal component, the x- and y-direction strains can be mathematically resolved as will be readily apparent.

Although it is currently contemplated that the more accurate strain gauges would be miniature but otherwise conventional strain gauges having multiplied lengths such as those discussed above, it may be possible to obtain acceptable strain/vibration measurement and hence suspension closed-loop bandwidth performance by using a simple structure such as that shown in FIG. 5 as a strain gauge merely by attaching wires at or near the four compass point ends of the pseudo symmetry structure, and measuring the changes in resistance across the pseudo symmetry structure itself.

Figure 8:
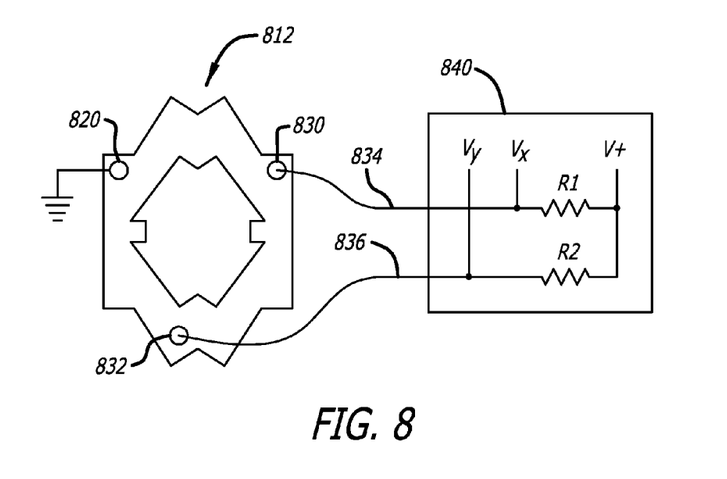
FIG. 8 is a schematic illustration of a pseudo symmetry structure according to a further embodiment of the invention, in which the pseudo symmetry structure itself is used as a strain gauge.

FIG. 8 is a schematic illustration of a pseudo symmetry structure according to a further simplified embodiment of the invention in which the pseudo symmetry structure itself is used as a strain gauge. In this embodiment, pseudo symmetry structure 812 is grounded at point 820 but is otherwise electrically isolated from the rest of the suspension. Two conductive leads 834 and 836 are attached to the structure at bonding points 830 and 832, respectively. As pseudo symmetry structure 812 compresses and elongates in the x and y directions, the electrical resistance between ground on the one hand, and bonding points 830 and 832 on the other hand, change. The changes in electrical resistance between bonding points 830 and 832, which defines the output of the strain gauge, cause voltages $V_x$ and $V_y$ within measurement circuit 840 to change. Those changes in voltages are then converted to strain measures and used within the servo-system as discussed above to improve the accuracy of the head positioning servo-system. Well known measurement circuit 840 includes an input voltage V+ and two known resistance values R1 and R2.

Although the drawings herein generally show the PZT and the pseudo symmetry structures as being aligned parallel to the longitudinal axis of the load beam, the invention is obviously not confined to any particular orientation of the PZT and the pseudo symmetry structure. Rather, the PZT and the pseudo symmetry structure could be angled, either toward the central longitudinal axis of the load beam or away from it. Examples of pairs of PZTs being aligned either parallel to the longitudinal axis, or toward or away from it, are found in the prior art, and it is anticipated that the present invention could be advantageously applied as an improvement to all of that prior art.

The present invention can be used in combination with microactuators other than PZTs. Additionally, the present invention can be applied to suspensions regardless of where the microactuator is located on the suspension, including suspensions in which the microactuator is located on the mount plate, on the load beam, on the gimbal tongue, or any other location.

Although the present invention enables a DSA suspension to be constructed using a single, single-pole PZT, the invention is applicable and can be used in other contexts as well. For example, the invention could be employed with a single split-pole PZT, or even with multiple PZTs in a hard drive suspension or other product where it would be desirable to mimic a PZT microactuator or other component. Additionally, the pseudo symmetry structure could be mounted either on the same face of the suspension as the PZT, or on the face opposite from the PZT.

In all of the embodiments discussed above, the pseudo symmetry structure is a passive structure, meaning that no power is provided to the structure to provide a motive force to the suspension. The passive pseudo symmetry structure in the embodiments discussed above is either simply a piece of material and/or the lack of material, and in some embodiments includes a passive sensor such as a strain gauge. In other possible embodiments, the pseudo symmetry structure could take the form of some active component other than a microactuator.

It will be understood that the terms "approximately," "about," "substantially," and "generally" as used within the specification and the claims herein allows for a certain amount of variation from any exact dimensions, measurements, arrangements, and characteristics, and that those terms should be understood within the context of the description and operation of the invention as disclosed herein.

It will further be understood that terms such as "top," "bottom," "above," "below," "horizontal," and "vertical" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. In a suspension for a data storage drive, a method of achieving fine movements of a read-write head, the method comprising:
    determining a stiffness of a microactuator on a first lateral side of the suspension;
    balancing the microactuator on the first lateral side of the suspension by providing a pseudo symmetry structure disposed on a second lateral side of the suspension opposite the first side, the pseudo symmetry structure having a mass and a stiffness that generally mirror a mass and a stiffness of the microactuator, the pseudo symmetry structure not comprising a microactuator; and
    moving the read-write head by actuating the microactuator on the first lateral side of the suspension.

2. The method of claim 1 wherein:
    the pseudo symmetry structure comprises at least one of (a) a structure formed into stainless steel material of the suspension by a material removal method and (b) a component separately formed and thereafter affixed to the suspension;
    and wherein:
    the balancing structure comprises a strain gauge; and
    a head positioning servo-system sends movement control signals to the microactuator and to an actuator motor that is coupled to the suspension;
    the method further comprising:
    determining movements of the suspension based at least in part on an output from the strain gauge, and sending actuation signals to at least one of the actuator motor and the microactuator at least partially in response to said determined movements in such a manner as to increase a closed-loop bandwidth of the head positioning servo-system.

3. A method of adjusting a suspension for a data storage drive, the suspension having a microactuator disposed on a first lateral side of the suspension, the method comprising:
    determining a stiffness of the microactuator on the first lateral side of the suspension;
    adjusting a stiffness of the suspension on a second lateral side of the suspension opposite the first lateral side of the suspension so as to make the suspension more symmetric in stiffness about a central longitudinal axis thereof;
    determining a mass of the microactuator on the first lateral side of the suspension; and
    adjusting a mass of the suspension on the second lateral side of the suspension so as to make the suspension more symmetric in mass about the central longitudinal axis;
    wherein the stiffness adjusting step and the mass adjusting step do not comprise positioning a second microactuator on the second lateral side of the suspension.

4. The method of claim 3 wherein the step of adjusting mass comprises affixing a passive weight to the second lateral side of the suspension.

5. The method of claim 3 wherein the step of adjusting stiffness comprises integrally forming a spring in the second lateral side of the suspension generally opposite the microactuator, a stiffness of the spring tending to balance out the stiffness of the microactuator.

6. The method of claim 5 wherein the stiffness of the spring is within 20% of the stiffness of the microactuator.

7. The method of claim 3 wherein the step of adjusting stiffness comprises forming an aperture in the suspension on the second lateral side of the suspension, and integrally forming a spring in the suspension on the second lateral side of the suspension.

8. The method of claim 7 wherein the aperture and the spring are adjacent one another.

9. The method of claim 3 wherein the adjusting steps together comprise:
   forming an aperture in the suspension on the second lateral side of the suspension;
   integrally forming a spring in the suspension on the second lateral side of the suspension; and
   affixing a passive weight on the second lateral side of the suspension;
   wherein the aperture, the spring, and the weight are all located within an area that is less than or equal to an area that is occupied by the microactuator.

10. The method of claim 3 wherein the step of adjusting stiffness comprises integrally forming a spring in the second lateral side of the suspension opposite the microactuator, and the step of adjusting mass comprises affixing a weight to the second lateral side of the suspension opposite the microactuator.

11. The method of claim 3 wherein the step of adjusting stiffness comprises local laser irradiation.

12. The method of claim 3 wherein the step of adjusting stiffness comprises heat treating.

13. The method of claim 3 wherein the step of adjusting stiffness comprises:
   forming an aperture within the suspension;
   forming a spring separate from the suspension; and
   affixing the spring across the aperture.

14. The method of claim 3 wherein the stiffness adjusting step comprises;
   forming a spring separate from the suspension;
   compressing the spring;
   attaching the spring to the suspension while the spring is compressed; and
   releasing the spring;
   such that the spring exerts an outward force on the suspension, the outward force keeping the microactuator in compression at all times during operation of the suspension.

15. The method of claim 3 wherein the step of adjusting stiffness comprises providing a spring on the second lateral side of the suspension, the spring being compressed in response to expansion of the microactuator.

16. The method of claim 15 wherein the suspension includes a mount plate, a load beam and a gimbal tongue, and wherein the microactuator and the spring are located on at least one of the mount plate, the load beam, and the gimbal tongue.

17. A method of adjusting a suspension for a data storage drive, the suspension having a microactuator disposed on a first lateral side of the suspension, the method comprising:
   determining a stiffness of the microactuator;
   providing a spring on a second lateral side of the suspension opposite the first lateral side, the spring being disposed generally opposite the microactuator, the spring having a stiffness that is within 20% of the stiffness of the microactuator, the spring being compressed in response to expansion of the microactuator.

18. The method of claim 17 wherein the spring is integrally formed so as to have a unitary construction with at least one of a mount plate, a load beam, and a gimbal tongue of the suspension.

* * * * *